B. FITTS.
Damper Regulators.
No. 135,103.  Patented Jan. 21, 1873.
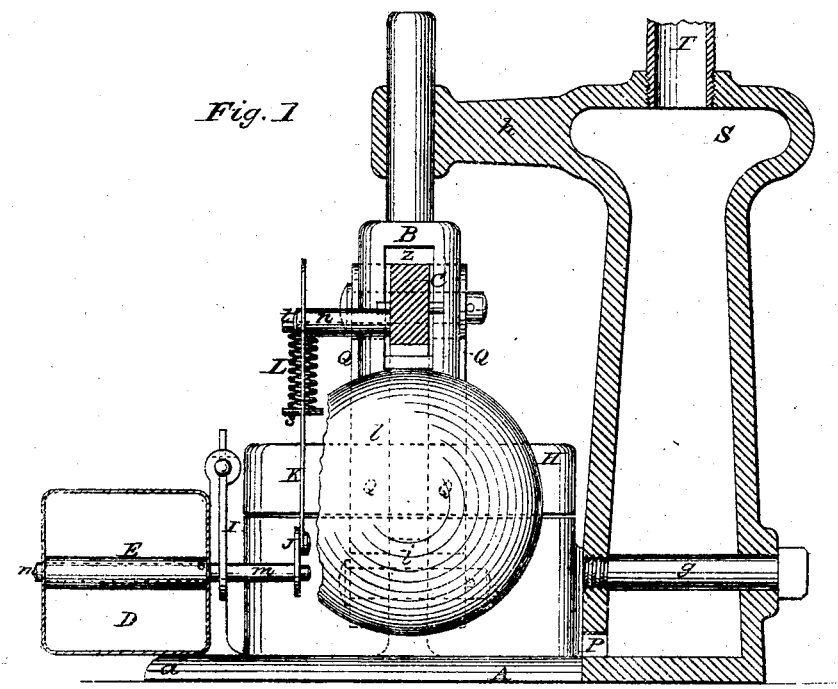
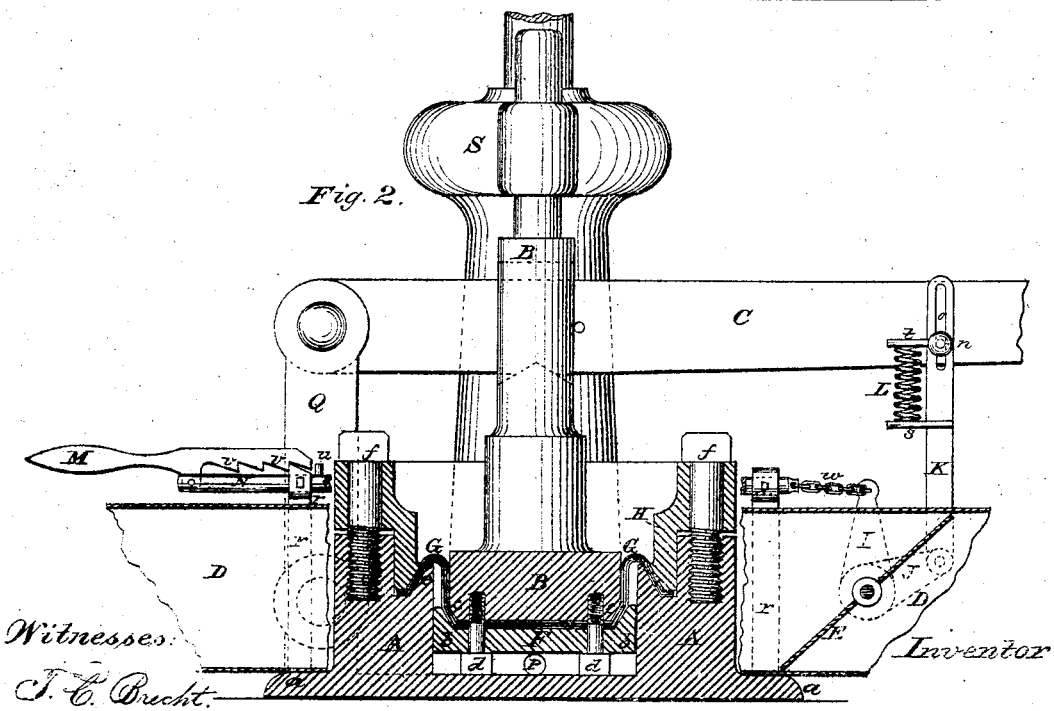

UNITED STATES PATENT OFFICE.

BENAIAH FITTS, OF WORCESTER, MASSACHUSETTS, ASSIGNOR TO UNION WATER-METER COMPANY, OF SAME PLACE.

IMPROVEMENT IN DAMPER-REGULATORS.

Specification forming part of Letters Patent No. 135,103, dated January 21, 1873.

*To all whom it may concern:*

Be it known that I, BENAIAH FITTS, of Worcester, in the county of Worcester and State of Massachusetts, have invented certain Improvements in Automatic Damper-Regulators; of which the following is a specification, reference being had to the accompanying drawing making part of this specification, in which—

Figure 1 represents an end view of an apparatus having my improvement applied thereto, but showing the water-chamber in section; and Fig. 2, a side elevation of the same, but showing the base or cylinder, piston, and diaphragm in section.

The object of this invention is to provide a simple and effective self-acting damper for use in connection with the furnaces of steam-boilers, by means of which any given pressure of steam within the capacity of the boiler can be automatically maintained when once properly adjusted to the pressure required; and it consists in combining with a damper, arranged in the smoke-flue of the furnace, certain devices to be operated upon by the pressure of the steam in the boiler in such manner that when the pressure is higher than is desired it will, through the devices referred to, so act on the damper as to close, or partially close, as the case may be, the smoke-flue of the furnace, and vice versa when too low.

To enable others skilled in the art to make, construct, and use my improvement, I will now proceed to describe it in detail, omitting a description of such parts of the steam-boiler as are non-essential to a full understanding of the invention.

By reference to the drawing it will be seen that the apparatus consists of a short and strong cylinder, A, open at one end and closed at the other, and provided with a flange, *a*. This closed end and flange form the base upon which the machine stands, and by means of which it can be firmly secured to its bed, if so desired. Into this cylinder, which may be made of any suitable material, is arranged and fitted a piston-head, F. The upper side of this piston-head F is fitted with a beveled flange, *b*, while the lower side of the piston B is fitted with a corresponding beveled edge, *c*, for the purpose of clamping of the rubber diaphragm G between them, as shown in Fig. 2, and which is effected by means of the screws *d*, of which there may be two, three, or more; but three are deemed sufficient. The rubber diaphragm G may be a disk of rubber of suitable thickness; but I prefer it to be made in the form of a cylinder—such as a section of rubber hose—the inside diameter of which should be of the same diameter of the piston B, or thereabout. The rubber cylinder or diaphragm, cut to the proper length, is then slipped over the piston until the lower end of the rubber cylinder is flush with the bottom of the piston; the piston-head F is then fitted on so as to make its beveled flange *b* catch over the outer edge of the diaphragm, and screwed tight to the piston by means of the screws *d*. This effectually clamps the tubular diaphragm G to the piston. This done, the diaphragm is turned inside out and the piston put in place inside of the cylinder A; the diaphragm G is then forced out and over the beveled edge *e* of the cylinder A, and ring H put on and screwed down, as shown in Fig. 2, by means of screws *f*, thereby fastening the diaphragm to the cylinder A. The piston, being thus connected to the cylinder, can move freely back and forth, as the diaphragm will fold out and in with but little friction or wear, or without changing the effective area of the piston, as is the case with a flat diaphragm. The ring H is beveled on the inside so as to fit over the outer bevel *e* of the upper edge of the cylinder A. On one side of the cylinder A is cast, or otherwise secured, a water-chamber, S, which, in this case, is represented as formed in a separate piece and secured to the side of the cylinder A by means of a screw-bolt, *g*, their joint being made water-tight by rubber or other suitable packing. The upper end of this chamber is enlarged, as shown in Fig. 1, and communicates with the boiler by means of a pipe, T, for a purpose to be hereafter described. In the lower part of the chamber S is formed a passage or channel, P, which communicates with a corresponding passage formed in the side and near the bottom of the cylinder A, immediately below the point of lowest descent of the piston-head F, as shown in Fig. 2, for which purpose the heads of the screws *d* are made to project sufficiently beyond the under side of the piston-head to prevent the latter from descending so far as to close the channel P between the water-chamber S and its under surface, thereby establishing a constant communication between the cylinder and water-chamber. On the side of the upper end of the water-chamber S next the cylinder A is formed or otherwise secured an arm, h, in the outer end of which is arranged a bearing for the support and guidance of the upper end of the piston B. C represents a lever, pivoted at one end to links Q, these links in turn being pivoted to a standard, i, cast or otherwise secured to the flange a of the cylinder A. This lever C is made to project through a vertical slot, z, formed in the piston-rod B, and carries on its outer end an adjustable weight or ball, l. Thus arranged, the lever is made to rest on the piston B with sufficient force to hold the piston down against the pressure of steam desired to be carried in the boiler, but not otherwise, as will hereafter be referred to. D represents part of the smoke-flue of the boiler, and is represented as being secured to standards k, erected on the flange a of the cylinder A.

In Fig. 2 part of the flue D is represented as being removed, to show the arrangement of the damper E on its inside, it being made to turn on a rock-shaft, m, which has its bearings in the sides of the flue. This rock-shaft is made to project through the side of the flue next the cylinder, as shown in Fig. 1, and has two arms, J and I, rigidly secured thereto. To the outer end of the arm J is pivoted the lower end of a rod, K, the upper end of which is pivoted to a stud-pin, n, made fast to the side of the lever C. For this purpose the upper end of the rod K is provided with a slot, o, which embraces a small screw-pin, which screws into the end of the stud-pin n, the head of the screw holding the rod in place; or the slotted rod K may be held in place on the stud in any other suitable manner, so long as it is free to turn or to slide up and down on the same, as the case may be, for the purpose shortly to be hereafter described. To the rod K is secured an arm, s, which, being provided with a small stud, forms a spring-seat for the lower end of a spiral spring, L, the upper end of which finds its corresponding seat in an arm, t, secured to the side of the lever C, or to the stud n, with which latter it may be made in one piece, if desired. To the outer end of the arm I, before referred to as being secured to the damper-shaft m, is loosely attached one end of a chain or other flexible and jointed connection. The other end of this chain is attached in a similar manner to a rod, N, which is free to slide back and forth in bearings arranged for the purpose in the upper end of the standards r. This rod N is made to extend backward near to the door of the furnace. On its end, at that point, is pivoted a handle, M, which is provided with a catch or catches, v, as shown, and is so constructed and arranged as to engage with the angular edge formed on the upper end of the standard r.

Thus constructed, the operation of the regulator is as follows: Steam communication with the boiler being established with the regulator by means of the pipe T on the top of the water-chamber S, the weight l is adjusted on the lever C, and secured thereto, by means of a thumb-screw, at such point as will counterbalance the pressure of the steam on the column of water in the chamber S which the boiler is required to carry. Up to the time required to raise the steam to this pressure the damper E will remain perfectly open; but the moment the pressure becomes greater than the force exerted upon the piston E by the weighted lever C, the piston then commences to rise, carrying with it the lever C, and which, being connected with the crank-lever J on the end of the damper-shaft m by the rod K, causes the damper, as the lever rises, to turn and partially close the flue, arresting the draft of the furnace, and thereby reducing the intensity of the fire and the rapid production of steam. This condition will remain until the pressure has been reduced to the required degree, when the weighted lever will cause the piston to descend to its normal position, and by that act reopen the damper, and which is effected by virtue of the gravity of the rod K and crank-lever J, and the action of the spring L upon the rod K, and which for this purpose is made sufficiently strong on the descent of the lever C to carry the rod K along with it the same as if the latter had been pivoted to the former by a simple circular opening instead of a slotted one. These movements of the damper occur as often as the pressure in the boiler exceeds the pressure required.

In this connection I wish to state that so far as the automatic action of the valve is concerned the rod K may be pivoted to the lever c in the ordinary way—that is to say, without the slot—in which event the spiral spring L may be dispensed with entirely. In fact, the only reason it is made with the slot and used in connection with the spring is to enable the engineer to close the damper at night, or when the workmen go to their meals, and which he effects by drawing the rod N and fastening the catch v on the handle M against the upper edge of the standard r, as shown in Fig. 2. This drawing of the rod N will turn the crank-lever I of the damper-shaft, as the two are connected by a chain or other flexible connection, thereby closing the damper. Now, it will be apparent that, if the rod K had been simply pivoted to the lever c instead of being pivoted by a slot, the only way he could have turned the damper would have been by raising the weighted lever also, which would have required the exertion of too much force to have made the device of any practical value; hence the value of the slot in the rod K, while the rod N is used for the purpose described. In the same way, when the engineer returns and desires to start the engine again he detaches the catch v by the handle m and pushes back the rod N, which, loosening the tension and the chain, allows the spring L, (which had been compressed by the former action of the rod K as it was made to slide over the pivotal pin on the lever C,) by its elastic force, to depress the rod K and crank-lever J, thereby reopening the damper E. To prevent the rod N from being drawn too far back a stop, u, is inserted at the proper point to abut against the standard r, as seen in Fig. 2.

The object of the enlargement of the water-chamber S at its top is this: When a small elongated chamber is used, as the piston rises by the pressure of the steam of the boiler on its head, the water in the chamber recedes, and the pressure upon the piston is accordingly lessened in a ratio proportioned to the weight of the column of water, causing a variation in the working of the regulator; but, by enlarging the area of the chamber at the top sufficiently to hold the quantity of water the cylinder will take up, the height of the column of water in the chamber will remain about the same, and the ma- chine for all practical purposes work uniformly.

In the event of the chamber S becoming too full of water by the condensation of steam, a cock may be inserted in the top of the chamber at such a point as will draw off the superabundant water down to the level required. Moreover, oil or any other suitable liquid may be used in chamber S instead of water.

Having thus described my invention, what I claim as new, and desire to secure by Letters Patent, is—

1. An automatic damper-regulator, consisting of a water-chamber, S, pipe T, water-channel P, cylinder A, piston B F, diaphragm G, and weighted lever C, the whole being arranged and operated in the manner substantially as described.

2. The combination, substantially as described, of a damper, E, in the smoke-flue of a chimney, or its equivalent, with the devices set forth in the first claim.

3. The combination of the hand-levers M N, catches v, standards r, and flexible connection w with the crank-lever I of the damper E, for the purpose set forth.

4. The combination of the damper E with the crank-lever J, slotted rod K, spring $l$, and weighted lever C of an automatic regulator, for the purpose set forth.

5. The combination of the devices set forth in the third claim, or their equivalents, with the crank-lever J, slotted rod K, spring L, and weighted lever C of an automatic regulator, for the purpose set forth.

6. The tubular diaphragm G, connected to the piston F and cylinder A, as and for the purpose set forth.

7. The water-chamber S, when constructed with an enlargement at top, and arranged to operate substantially as shown and described, for the purpose set forth.

BENAIAH FITTS.

Witnesses:
JOHN C. OTIS,
ABRAHAM FITTS.